US008258983B2

(12) United States Patent
Conner et al.

(10) Patent No.: US 8,258,983 B2
(45) Date of Patent: Sep. 4, 2012

(54) SYSTEMS AND METHODS FOR REAL-TIME DATA LOGGING OF AN ENHANCED GROUND PROXIMITY SYSTEM

(75) Inventors: Kevin J Conner, Kent, WA (US); Gary A. Ostrom, Bellevue, WA (US); C. Don Bateman, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 112 days.

(21) Appl. No.: 12/854,494

(22) Filed: Aug. 11, 2010

(65) Prior Publication Data

US 2012/0038493 A1 Feb. 16, 2012

(51) Int. Cl.
*G01C 21/00* (2006.01)

(52) U.S. Cl. .......................................................... 340/977

(58) Field of Classification Search .................. 340/977, 340/961, 963, 539.11; 455/98, 431; 701/3
See application file for complete search history.

(56) References Cited

U.S. PATENT DOCUMENTS 7,428,412 B2 * 9/2008 Wright et al. ................. 455/431
2005/0039006 A1 2/2005 Stelling et al.
2005/0149238 A1 7/2005 Stefani et al.
2005/0228558 A1 10/2005 Valette et al.
2005/0248464 A1 * 11/2005 Rakes et al. .................. 340/584
2007/0027589 A1 2/2007 Brinkley et al.
2009/0024312 A1 * 1/2009 Brinkman ..................... 701/200
2009/0082013 A1 3/2009 Eckert et al.
2009/0243895 A1 * 10/2009 Mitchell et al. ............... 340/971

OTHER PUBLICATIONS

Charlotte Adams; Virtual Data Acquisition; AVIONICS Magazine; Jan. 1, 2004; http://www.aviationtoday.com/avicategories/commercial/Virtual-Data-Acquisition_677.html.
Honeywell, MK XXII Enhanced Ground Proximity Warning System (Class A TAWS) for Rotorwing Aircraft Installation Manual 060-4314-250 Rev A; Release Date: Dec. 5, 2004.

* cited by examiner

*Primary Examiner* — Phung Nguyen
(74) *Attorney, Agent, or Firm* — Lowe Graham Jones PLLC

(57) ABSTRACT

Systems and methods for performing efficient, inexpensive data logging of aircraft sensor data. An example system on board an aircraft includes a plurality of data sources that provide sensor data associated with a plurality of avionic components, a line replaceable processing unit that is in signal communication with the plurality of data sources via one or more databuses, a wireless router connected to the line replaceable processing unit via a data cable and a portable data unit in wireless data communication with the wireless router. The wireless router receives at least a portion of the sensor data from the line replaceable processing unit and sends the received sensor data to the portable data unit.

7 Claims, 4 Drawing Sheets

SYSTEMS AND METHODS FOR REAL-TIME DATA LOGGING OF AN ENHANCED GROUND PROXIMITY SYSTEM

BACKGROUND OF THE INVENTION

The current method for recording flight data on an aircraft is performed in the flight data recorder or black box. The flight data recorder is a good tool for recording flight data at a terminal stage of flight. However, the data included therein does not provide a valuable tool for analyzing and evaluating conformity of flight crew operation from take off to landing of a flight.

Options for presenting a quick access recording system have proven to be both difficult to implement and beyond the expense that most aircraft operators are willing to incur.

SUMMARY OF THE INVENTION

The present invention provides systems and methods for performing efficient, inexpensive data logging of aircraft sensor data. An example system on board an aircraft includes a plurality of data sources that provide sensor data associated with a plurality of avionic components, a line replaceable processing unit (LRU) that is in signal communication with the plurality of data sources via one or more databuses, a wireless router connected to the line replaceable processing unit via a data cable and a portable data unit in wireless data communication with the wireless router. The wireless router receives at least a portion of the sensor data from the line replaceable processing unit and sends the received sensor data to the portable data unit.

In one aspect of the invention, the line replaceable processing unit includes an Enhanced Ground Proximity Warning System (EGPWS) having an auxiliary data port. The auxiliary data port outputs at least a portion of the sensor data.

In another aspect of the invention, the portable data unit includes an application program (e.g. WinViews) that outputs at least a portion of the sensor data.

In still another aspect of the invention, the wireless router and portable data unit are replaced by or included with internal and/or removable memory that records the sensor data.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
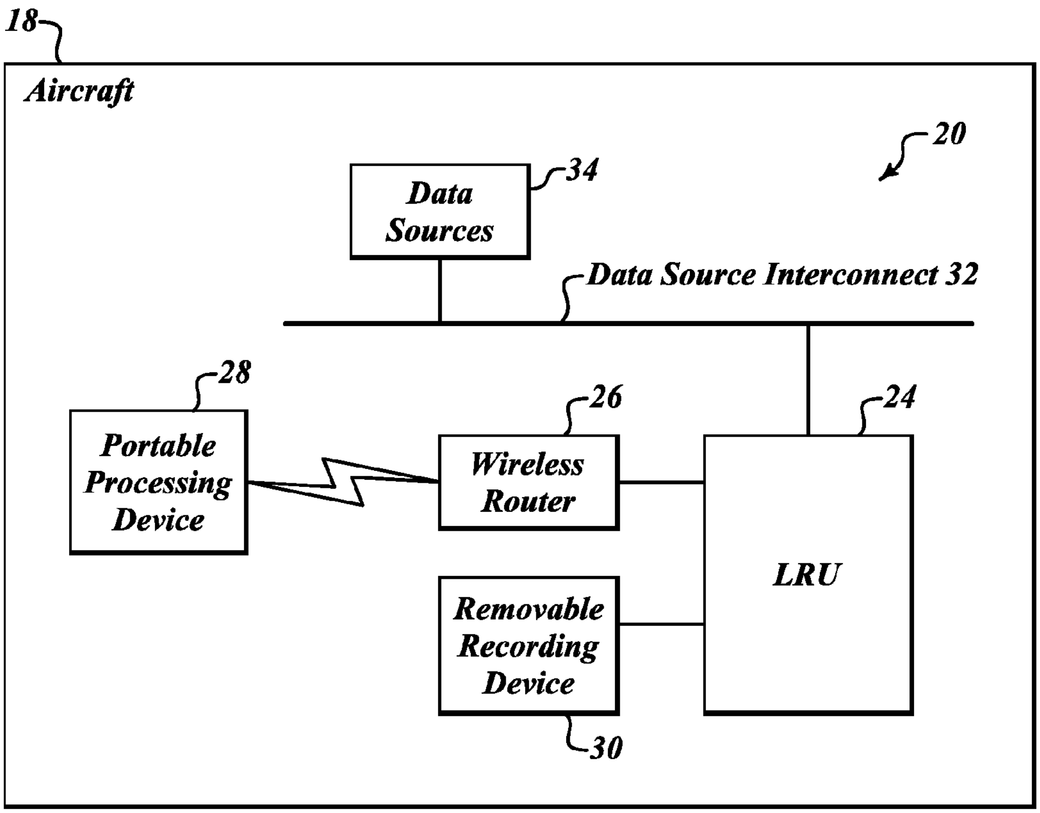
FIG. 1 is a schematic diagram illustrating a system formed in accordance with an embodiment of the present invention.

FIG. 1 illustrates a system 20 that is designed to perform real-time data logging of flight data. In one embodiment, the system 20 includes a line replaceable unit (LRU) 24, a wireless router 26 and a portable processing device 28. In another embodiment, a removable recording device 30 replaces or is added in addition to the wireless router 26 and the portable processing device 28. The line replaceable unit 24 is in data communication with data sources 34 through one or more data source interconnects (e.g. ARINC databases, analog sensors, discretes) 32. The LRU 24 is wired connected to the wireless router 26. In the alternate embodiment the LRU 24 includes a wired connected to the portable memory device 30.

The wireless router 26 is in wireless communication with the portable receiver device 28. The LRU 24 receives flight data from various data sources 34 within an aircraft 18 via the data source interconnects 32. The flight data that the LRU 24 retrieves is made available to the portable receiver device 28 via the wireless router 26 and/or the portable memory device 30. In one embodiment, the flight data is stored in real-time on the portable memory device 30 or at the portable receiver device 28.

Figure 2:
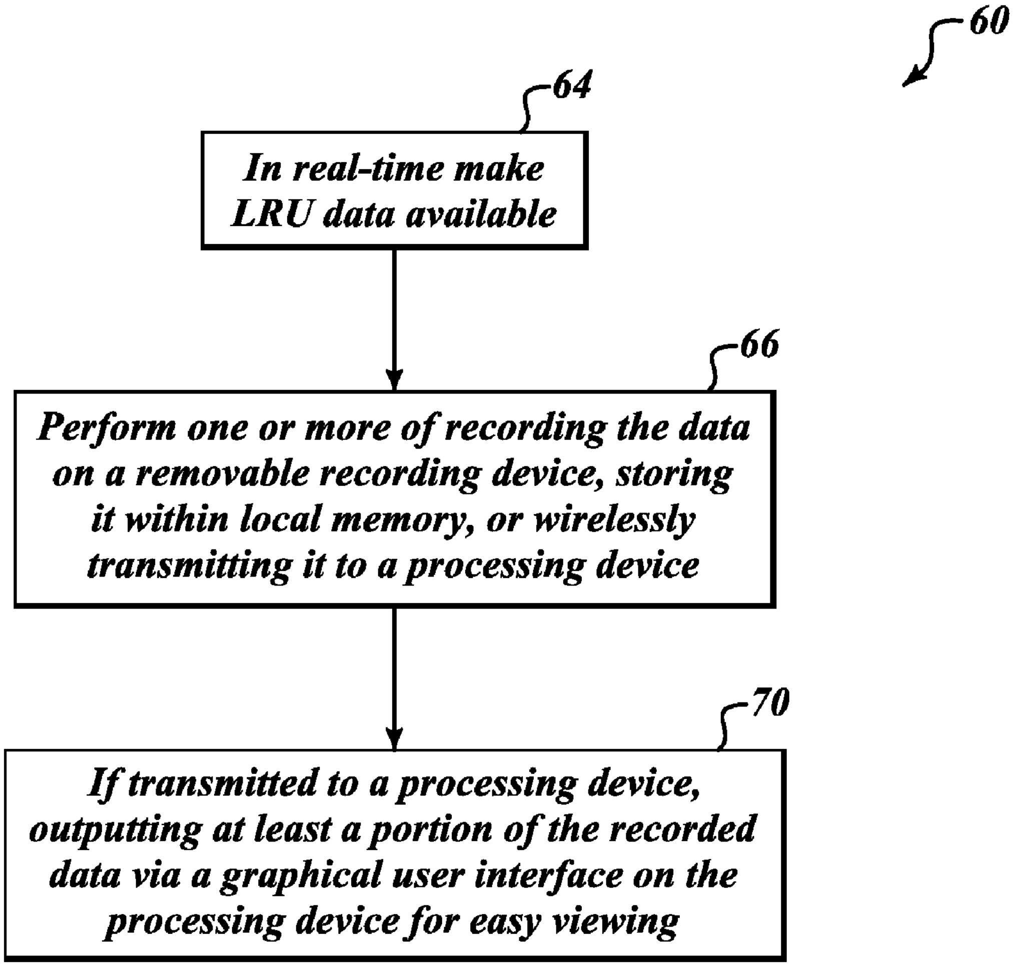
FIG. 2 illustrates a flow diagram of an example process performed by the system shown in FIG. 1.

FIG. 2 illustrates a flow chart of an exemplary process 60 performed by the system 20 shown in FIG. 1. First at a block 64, the LRU 24 makes flight data available in real-time at a port located on the LRU 24. At a block 66, the flight data made available by the LRU 24 at the data port is one or more of recorded onto the removable recording device 30, stored within local memory of the LRU 24 or wirelessly transmitted to the portable processing device 28 via the wireless router 26. Then at a box 70, if the flight data on the LRU 24 was transmitted to the portable processing device 28, the portable processing device 28 outputs at least a portion of the recorded data via the graphical user interface presented on a display of the portable processing device 28. The recorded data may be viewed on the portable processing device 28 or the data is offloaded to a general purpose digital computer (not shown) for viewing and analysis.

An example of the portable processing device 28 is a Personal Data Assistant (PDA). In one embodiment the LRU 24 is an Enhanced Ground Proximity Warning System (EGPWS) made by Honeywell International, Inc. The EGPWS receives a variety of inputs, such as air data, GPS, radio altitude, display, navigation, attitude, heading, torque, discrete values, internally computed output values, and discrete outputs. The following is a non-conclusive list of signals and data that are available for output by the EGPWS to the portable processing device 28 or the removable recording device 30:

| Air Data inputs |
|---|
| Uncorrected Baro Alt |
| Computed Airspeed |
| Barometric Rate |
| Static Air Temperature |
| **GPS inputs** |
| Latitude |
| Longitude |
| GPS Hor. Int. Limit |
| Altitude |
| VFOM |
| HFOM |
| Ground Speed |
| True Track Angle |
| North/South Velocity |
| East/West Velocity |
| Vertical Velocity |
| Sensor Status |
| UTC |
| Date |
| **Radio Altitude Input** |
| Radio Altitude |
| Decision Height/MDA |
| Display inputs |

-continued

| |
|---|
| Display 1 Mode |
| Display 1 Range |
| Display 2 Mode |
| Display 2 Range |
| Navigation Inputs |
| Glideslope |
| Localizer |
| Selected Course |
| Attitude Inputs |
| Roll Angle |
| Pitch Angle |
| Heading Inputs |
| Magnetic Heading |
| True Heading |
| Torque Inputs |
| Rotor Torque 1 |
| Rotor Torque 2 |
| Discrete Inputs |
| Glideslope Inhibit |
| WOW |
| Audio Inhibit |
| Timed Audio Inhibit |
| Landing Gear |
| Glideslope Cancel |
| Low Altitude Mode Select |
| Terrain Awareness Inhibit |
| Internally Computed Output Data |
| Geometric Altitude |
| Geometric Altitude VFOM |
| EGPWS Aural Alerts |
| EGPWS Visual Alerts |
| Discrete Outputs |
| GPWS INOP Lamp |
| TAD INOP/Not Avail |
| Warning Lamp |
| Alert Lamp |
| Glidesope Cancel Lamp |
| Low Altitude Mode Lamp |
| TCAS Inhibit |
| Terrain Display Select #1 |
| Terrain Pop-Up |
| Terrain Display Select #2 |
| Timed Audio Inhibit |

Figure 3:
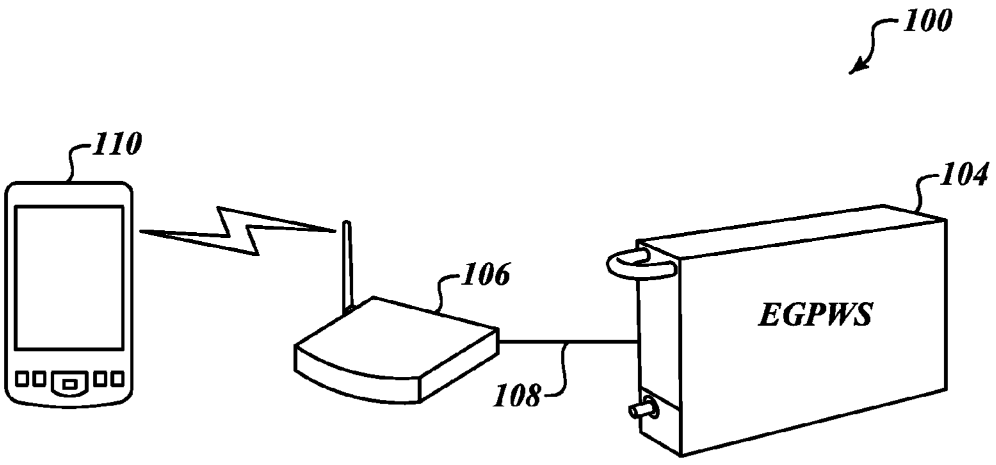
FIG. 3 illustrates a view of an exemplary system formed in accordance with an embodiment of the present invention.

FIG. 3 illustrates an example set-up for a system 100 implemented onboard an aircraft. The system 100 includes an EGPWS box 104 includes a central processing unit (CPU) that communicates to a wireless router 106 via a data cable (e.g. RS-232 cable) 108. The wireless router 106 is in wireless communication with a portable processing device 110. In one embodiment, the data cable 108 uses three wires (Transmit (Tx), Receive (Rx), and Common). In this embodiment, the portable processing device 110 includes a display and user interface components. The portable processing device 110 is connectable (wireless or wired) with a general purpose computer for downloading the data received from the EGPWS box 104. Once the data is retrieved from the portable processing device 110 then an analysis of the flight data can occur. Also, analysis can be performed on the portable processing device 110 provided it has a suitable application program. Part of the analysis of the flight data may include analyzing whether the aircraft adhered to standard operating procedures (SOP) during the evolution of the most recent flight.

The wireless router 106 (i.e., recording system) utilizes the Windows Virtual Interface to the Enhanced Warning System (WinViews) protocol to extract data from the EGPWS box 104. An application program (operating on the wireless router 106 and/or the portable processing device 110) that adheres to the WinViews protocol allows one to monitor or view values within the EGPWS box 104. This application program provides a monitor function that does not alter the operation of the EGPWS. This application program can automatically display the current value of each parameter extracted from the EGPWS box 104.

Figure 4:
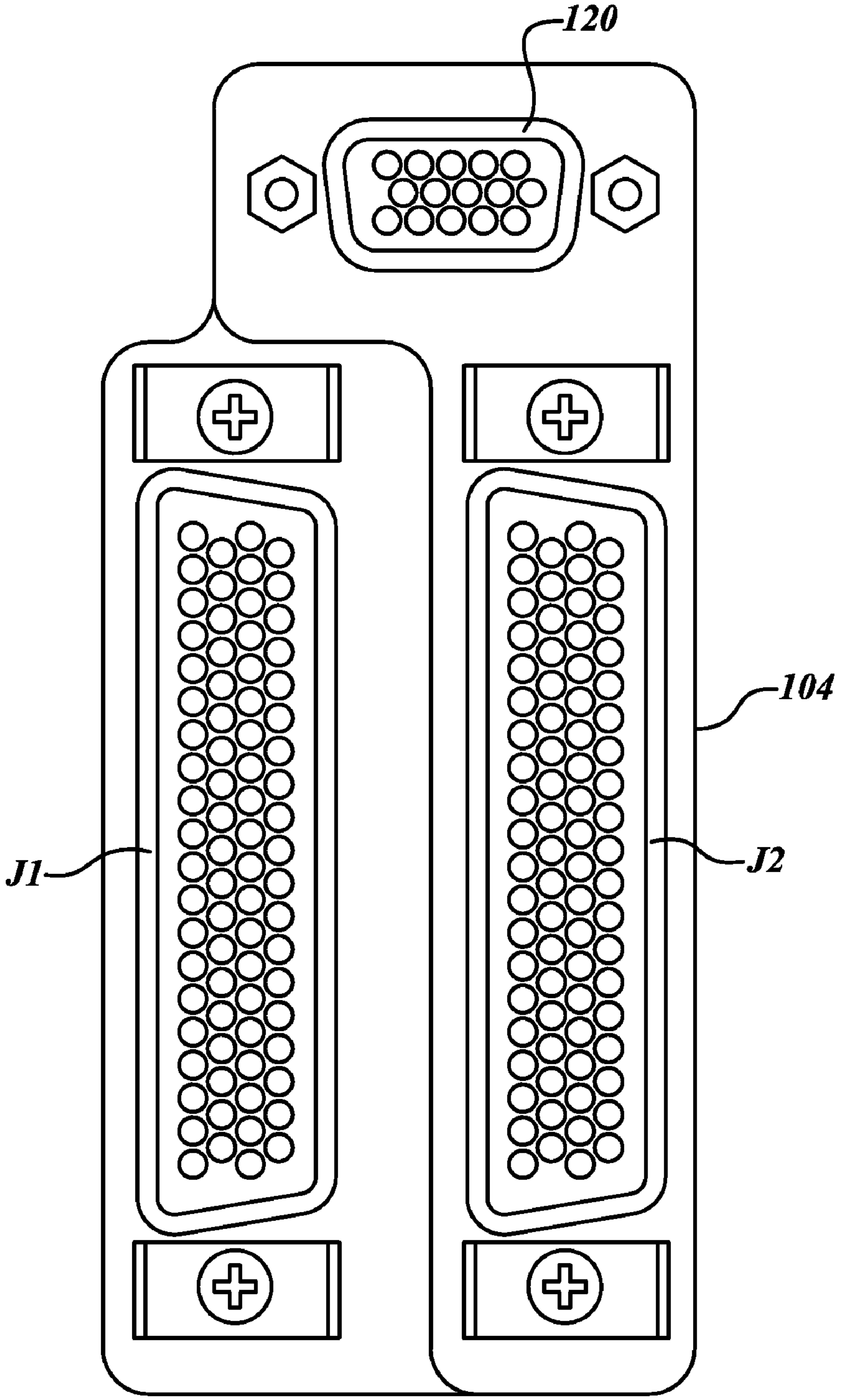
FIG. 4 illustrates a side view of an enhanced ground proximity warning system (EGPWS) formed in accordance with an embodiment of the present invention.

FIG. 4 illustrates a side view of an example the EGPWS box 104. The EGPWS box 104 includes standard input/output data ports J1 and J2 and includes an additional output data port 120 that is directly connected to the wireless router 26. In one embodiment, one of the pins of the port 120 is dedicated to the EGPWS monitor port (RS-232 receive) and another one of the pins is dedicated to the EGPWS monitor port (RS-232 transmit).

It is noted that the present invention may be implemented on other LRUs or other EGPWS units (e.g., KGP-560 and EM21) and not all EGPWS have the data ports J1 and J2. Thus, it is appreciated that the addition of an auxiliary data port coupled to the internal CPU for receiving sensor data based on the WinViews protocol can be performed on other LRUs or other EGPWS units (e.g., KGP-560 and EM21).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An avionics system on board an aircraft, the system comprising:

a plurality of data sources configured to provide sensor data associated with a plurality of aircraft components;

a line replaceable processing unit being in signal communication with the plurality of data sources via one or more databuses;

a wireless router connected to the line replaceable processing unit via a data cable; and a portable data unit in wireless data communication with the wireless router, wherein the wireless router receives at least a portion of the sensor data from the line replaceable processing unit and sends the received sensor data to the portable data unit.

2. The system of claim 1, wherein the line replaceable processing unit comprises an Enhanced Ground Proximity Warning System (EGPWS).

3. The system of claim 2, wherein the EGPWS comprises an auxiliary data port configured to output at least a portion of the sensor data.

4. The system of claim 3, wherein the data cable and the auxiliary data port conform to the RS-232 standard.

5. The system of claim 4, wherein the data cable includes three pins designated as transmit, receive and common.

6. The system of claim 2, wherein the portable data unit comprises an application program configured to output at least a portion of the sensor data.

7. The system of claim 6, wherein the application program utilizes a WinViews protocol.

* * * * *